US009674247B1

(12) United States Patent
Ward et al.

(10) Patent No.: US 9,674,247 B1
(45) Date of Patent: Jun. 6, 2017

(54) GENERATING MANIFEST FILES FOR DIGITAL MEDIA ITEMS

(75) Inventors: Matt Ward, San Francisco, CA (US); Matt Doucleff, Cambridge, MA (US); Eric Perkens-Argueta, Boston, MA (US)

(73) Assignee: GOOGLE INC., Mountain View, CA (US)

( * ) Notice: Subject to any disclaimer, the term of this patent is extended or adjusted under 35 U.S.C. 154(b) by 305 days.

(21) Appl. No.: 13/529,683

(22) Filed: Jun. 21, 2012

(51) Int. Cl.
*H04L 29/06* (2006.01)
*H04N 21/658* (2011.01)
*H04N 21/262* (2011.01)
*H04N 21/845* (2011.01)
*G06F 17/30* (2006.01)

(52) U.S. Cl.
CPC ........ *H04L 65/60* (2013.01); *G06F 17/30902* (2013.01); *H04N 21/26258* (2013.01); *H04N 21/6581* (2013.01); *H04N 21/8456* (2013.01)

(58) Field of Classification Search
CPC ......... H04N 21/8456; H04N 21/26258; H04N 21/4331; H04N 21/6581; H04L 65/60
USPC ........................................................ 709/219
See application file for complete search history.

(56) References Cited

U.S. PATENT DOCUMENTS

| | | | | |
|---|---|---|---|---|
| 8,060,909 B2* | 11/2011 | Krikorian et al. | ............... | 725/95 |
| 8,234,350 B1* | 7/2012 | Gu | ................. | H04N 21/234309 709/203 |
| 8,683,542 B1* | 3/2014 | Henry | ................... | H04L 1/0026 370/358 |
| 9,066,138 B1* | 6/2015 | Kraiman | ............... | H04N 21/458 |
| 2006/0010472 A1* | 1/2006 | Godeny | ............ | G06F 17/30038 725/62 |
| 2007/0005904 A1* | 1/2007 | Lemoal et al. | ................ | 711/137 |
| 2008/0310814 A1* | 12/2008 | Bowra et al. | .................... | 386/46 |
| 2009/0125634 A1* | 5/2009 | Virdi et al. | ..................... | 709/231 |
| 2009/0292820 A1* | 11/2009 | Li | ........................... | H04L 67/04 709/231 |
| 2010/0146569 A1* | 6/2010 | Janardhan | .......... | H04N 7/17318 725/98 |
| 2011/0033168 A1* | 2/2011 | Iyer | ........................ | H04N 7/173 386/241 |
| 2011/0296048 A1* | 12/2011 | Knox et al. | .................... | 709/231 |
| 2011/0314130 A1* | 12/2011 | Strasman | ................ | H04L 29/06 709/219 |
| 2012/0011270 A1* | 1/2012 | Priddle | ................. | H04L 65/605 709/231 |
| 2012/0042090 A1* | 2/2012 | Chen | ..................... | H04L 65/607 709/231 |
| 2012/0173753 A1* | 7/2012 | Moorthy | .......... | H04N 21/23406 709/231 |
| 2012/0174163 A1* | 7/2012 | Moorthy | ............ | H04N 21/4227 725/56 |
| 2012/0197419 A1* | 8/2012 | Dhruv | ................ | H04N 21/6543 700/94 |
| 2012/0198089 A1* | 8/2012 | Dhruv et al. | ................. | 709/231 |

(Continued)

*Primary Examiner* — Backhean Tiv
(74) *Attorney, Agent, or Firm* — Lowenstein Sandler LLP

(57) ABSTRACT

A media player generates a first manifest file for a digital media item as the digital media item is downloaded and/or processed. The first manifest file is used to seek to locations within a buffered portion of the digital media item. When a seek request to a location in an unbuffered portion is received, the media player downloads a second manifest file from a server. The second manifest file is used to seek for subsequent seek requests.

21 Claims, 5 Drawing Sheets

(56) References Cited

U.S. PATENT DOCUMENTS

| | | | |
|---|---|---|---|
| 2012/0278497 A1* | 11/2012 | Hsu | H04L 65/604 709/231 |
| 2012/0301104 A1* | 11/2012 | Dove | 386/239 |
| 2013/0054728 A1* | 2/2013 | Amir | H04N 21/2183 709/213 |
| 2013/0060956 A1* | 3/2013 | Nagaraj | H04N 21/4384 709/231 |
| 2013/0091249 A1* | 4/2013 | McHugh et al. | 709/219 |
| 2013/0091297 A1* | 4/2013 | Minder | H04N 21/23439 709/231 |
| 2013/0159388 A1* | 6/2013 | Forsman et al. | 709/203 |
| 2013/0238740 A1* | 9/2013 | Vass | G06F 17/30902 709/213 |
| 2013/0239145 A1* | 9/2013 | Broome | G06Q 50/01 725/41 |
| 2013/0291002 A1* | 10/2013 | Rothschild | H04N 21/258 725/25 |
| 2014/0140253 A1* | 5/2014 | Lohmar | H04L 65/4084 370/311 |

* cited by examiner

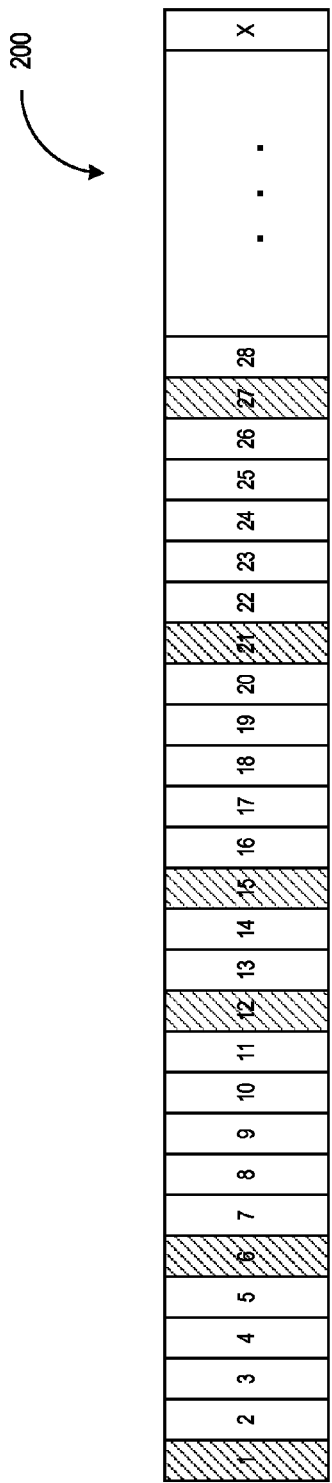
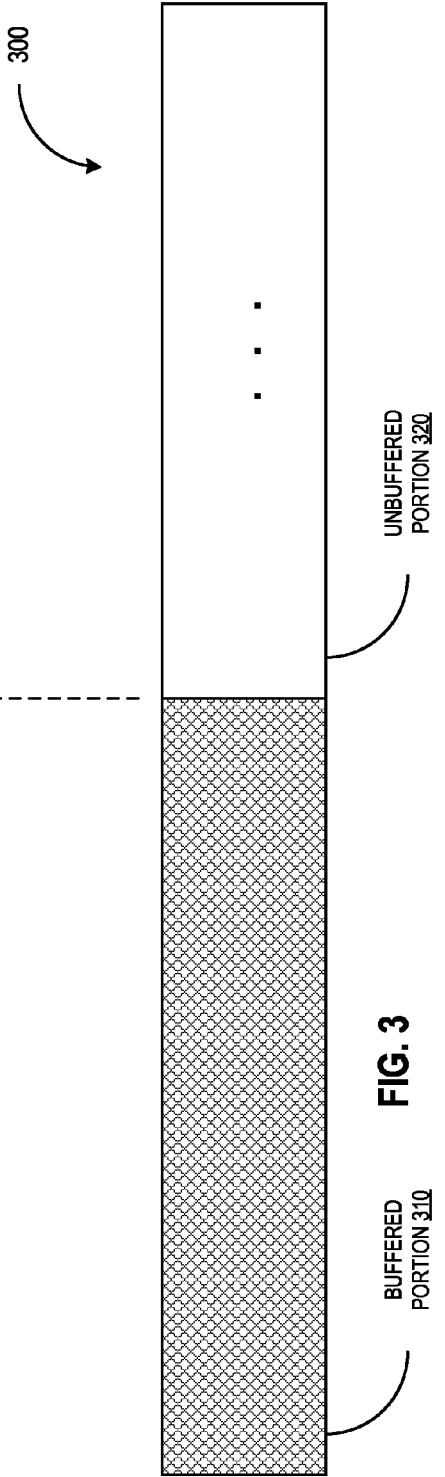
FIG. 2
FIG. 3

| FRAME # | PLAY TIME | BYTE LOCATION |
|---|---|---|
| 1 | 0 seconds | 0 kB |
| 6 | 0.5 seconds | 50 kB |
| 12 | 1.1 seconds | 110 kB |
| 15 | 1.4 seconds | 140 kB |
| | | |
| | | |
| | | |
| | | |

FIG. 4

| FRAME # | PLAY TIME | BYTE LOCATION |
|---|---|---|
| 1 | 0 seconds | 0 kB |
| 6 | 0.5 seconds | 50 kB |
| 12 | 1.1 seconds | 110 kB |
| 15 | 1.4 seconds | 140 kB |
| 21 | 2.0 seconds | 200 kB |
| 27 | 2.6 seconds | 260 kB |
| ⋮ | ⋮ | ⋮ |
| M | Y seconds | Z kB |

FIG. 5

GENERATING MANIFEST FILES FOR DIGITAL MEDIA ITEMS

TECHNICAL FIELD

Embodiments of the present disclosure relate to the field of digital media items and, more particularly, to generating and/or obtaining manifest files for digital media items.

BACKGROUND

Many media players allow the streaming of a digital media item from a server (e.g., playing portions of the digital media item which are downloaded and/or processed without requiring the digital media item to be completely downloaded and/or processed). Users may often seek to (e.g., specify, skip to, and/or initiate playback at) particular locations within a digital media item (e.g., a digital video file or digital audio file). A manifest file, which generally includes a mapping of keyframes in a digital media item to byte locations within the digital media item, is used to allow a user to seek to a particular location within the digital media item. A manifest file may also be referred to as an "index file" or a "video index." Generally, a client machine separately downloads the manifest file along with the digital media item, or the mapping of keyframes to byte locations is integrated with the digital media item. Separately downloading a manifest file or integrating the mapping information in a manifest file into a digital media item may increase the overhead (e.g., the amount of data downloaded and/or the number of requests for data) of the client device.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one embodiment, a method of generating and/or obtaining manifest files is presented. A client device may initiate buffering and playback of a digital media item hosted by a server device. The client device may generate a first manifest file for the digital media item as the digital media item is being buffered by the client device. Upon receiving a user request to seek to a buffered portion of the digital media item, the client device may seek to the buffered portion of the digital media item using the first manifest file. Upon receiving a user request to seek to an unbuffered portion of the digital media item, the client machine may request a second manifest file for the digital media item from the server device and may seek to the unbuffered portion using the second manifest file.

In one embodiment, after obtaining the second manifest file from the server device, the client device may associate the second manifest file with the digital media item. The client device may receive a second user request to seek to a buffered portion of the video file and may seek to the buffered portion of the video file using the second manifest file. In additional embodiments, computing devices for performing the operations of the above described embodiments are also implemented. Additionally, in embodiments of the disclosure, a computer readable storage media may store instructions for performing the operations of the embodiments described herein.

BRIEF DESCRIPTION OF THE DRAWINGS

The present disclosure will be understood more fully from the detailed description given below and from the accompanying drawings of various embodiments of the disclosure.

FIG. 2 is a block diagram illustrating a digital media item, according to one embodiment.

FIG. 3 is a block diagram illustrating a digital media item, according to another embodiment.

FIG. 4 is a table illustrating the contents of a manifest file, according to one embodiment.

FIG. 5 is a table illustrating the contents of a manifest file, according to another embodiment.

DETAILED DESCRIPTION

Figure 1:
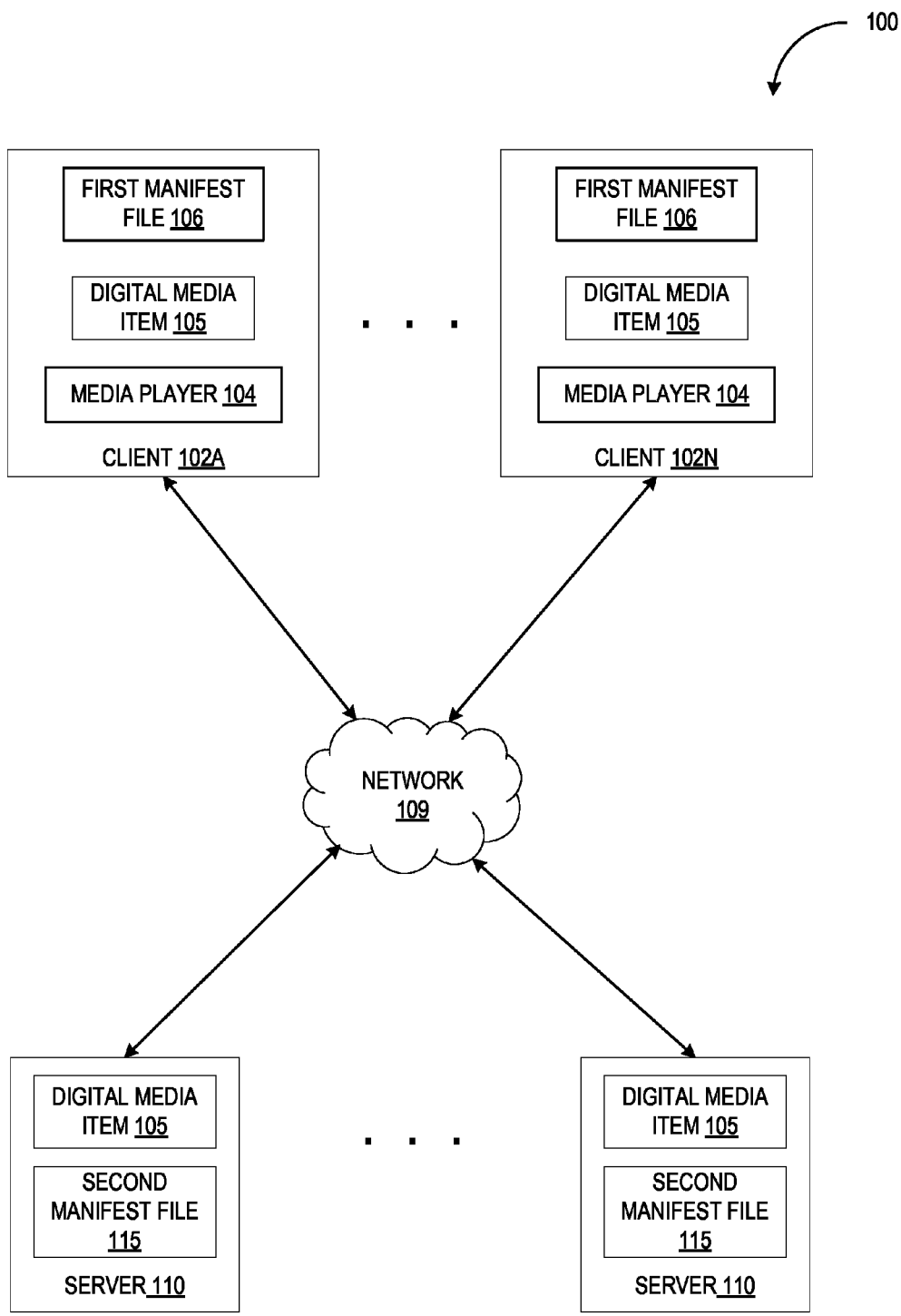
FIG. 1 illustrates an exemplary system architecture, in accordance with one embodiment of the present disclosure.

A system and method for generating and/or obtaining manifest files for digital media items are discussed herein. As used herein, a digital media item is an electronic representation of a video or an audio clip. Examples of digital media items include digital music and other audio files (e.g., moving picture experts group (MPEG) audio layer 3 (MP3) files, advanced audio coding (AAC) files, waveform audio file format (WAV) files, audio interchange file format (AIFF) files, Apple Lossless (m4A) files, etc.) and digital videos (e.g., MPEG-2 files, MPEG-4 (MP4) files, DivX files, audio video interlace (AVI) files, advanced video coding (AVC) files, VP8 files, Flash video (FLV) files, Matroska video (MKV) files, etc.). Digital media items may include both audio and video data (e.g., a video file may contain both audio and video). The term "user" may refer to a person, a business entity, a web bot (a software application that runs an automated task over the Internet), or any other program, individual or organization.

In one embodiment, a media player may begin playback and/or streaming of a digital media item, such as a streaming digital video. The media player may generate a manifest file for the digital media item. A manifest file may include a mapping of keyframes in a digital media item to byte locations within the digital media item. A manifest file can be used to allow a user to seek to a particular location within the digital media item. A manifest file generated by the media player is referred to herein as a client-based manifest file. A manifest file generated by a server is referred to herein as a server-based manifest file.

When generating a client-based manifest file for a digital media item, the media player may process each frame of the digital media item as it is being downloaded. The media player may analyze each frame to determine whether the frame is a keyframe. If the frame is a keyframe, the media player may add to the client-based manifest file the mapping of the keyframe and the play time of the keyframe, to a byte location in the digital media item. When the media player receives a request to seek to a buffered portion of the digital media item (e.g., to a location within a portion of the digital media item which has been downloaded and/or processed), the media player may use the client-based manifest file to seek to the buffered portion.

A user may want to seek to an unbuffered portion of the digital media item (e.g., to a location within a portion of the digital media item which has not yet been downloaded and/or processed). In one embodiment, if the media player receives a request to seek to an unbuffered portion of the digital media item, the media player downloads a server-based manifest file from a server. The server-based manifest file may contain a complete mapping of all of the keyframes in the digital media item, to their corresponding byte locations within the digital media item. The media player may associate the server-based manifest file with the digital media item and may use the server-based manifest file for subsequent seek requests. In one embodiment, the media player may obtain the server-based manifest file (e.g., may request, download, retrieve, etc.) prior to receiving a request to seek to an unbuffered portion of the digital media item.

Embodiments of the disclosure reduce the amount of data and/or the number of requests for data for a client device. Because the client device may generate a manifest file as the digital media item is being downloaded and/or processed, the client device may not need to separately download the manifest file from the server and the mapping information in the manifest file may not need to be integrated into the digital media item.

Note that some embodiments of the present disclosure are described with reference to videos. However, embodiments of the present disclosure also apply to audio clips (e.g., songs, albums, user generated audio files, etc.). For example, embodiments of the present disclosure may generate and/or obtain a manifest file for an audio clip.

FIG. 1 illustrates an exemplary system architecture 100, in accordance with one embodiment of the present disclosure. The system architecture 100 includes servers 110 and client machines 102A-102N connected to a network 109. Network 109 may be a public network (e.g., the Internet), a private network (e.g., a local area network (LAN) or wide area network (WAN)), a wired network (e.g., Ethernet network), a wireless network (e.g., an 802.11 network), a cellular network or broadcast network (e.g., a Long Term Evolution (LTE) network), or a combination thereof.

Server 110 may be a rackmount server, a router computer, a personal computer, a portable digital assistant, a mobile phone, a laptop computer, a tablet computer, a camera, a video camera, a netbook, a desktop computer, a media center, or any combination of the above. Server 110 includes the digital media item 105 (which may be provided and/or downloaded to the clients 102A-102N). The digital media items stored in the server 110 may include user generated content that is uploaded by clients 102A-102N. The digital media items may additionally or alternatively include content provided by other entities, e.g., service providers such as news organizations, publishers, libraries and so on. In embodiments of the disclosure, the server 110 notifies end users of the types of information that are stored by the server 110, and provides the end user the opportunity to opt-out of having such information assembled, analyzed, and/or shared.

The server 110 may receive digital media items from clients 102A-102N, and store those digital media items. The servers 110 may additionally serve digital media items (e.g., video and/or audio) to clients 102A-102N. The servers 110 may receive search queries and perform searches on the digital media items stored in the servers 110 to determine digital media items that satisfy the search query. Servers 110 may then send to a client 102A-102N those digital media items that match the search query. Clients 102A-102N may also obtain information on digital media items that are contained in the servers 110, such as by navigating a web page that provides digital media items and/or selecting one or more filters provided by the servers 110. Servers 110 may stream digital media items to clients 102A-102N, or may download the digital media items to the clients 102A-102N. In streaming, the clients 102A-102N can begin playback of video or audio files before receiving the entire audio or video (e.g., using media player 104). When the audio or video is downloaded, the audio or video typically is not playable until a complete file is received by the client 102A-102N.

Server 110 sends, streams or otherwise provides digital media items to requesting entities. An entity may interact with server 110 (e.g., via a web browser or a media player 104 running on a client 102A-102N) to browse or search for a digital media item. Server 110 may download JavaScript or other code to a client machine 102A-102N operated by the entity for media player 104. Server 110 may stream or download the selected digital media item to the client machine 102A-102N, and media player 104 executing on the client machine 102A-102N may play the digital media item.

The client machines 102A-102N may be personal computers (PCs), laptops, mobile phones, tablet computers, or any other computing devices. The client machines 102A-102N may run an operating system (OS) that manages hardware and software of the client machines 102A-102N. In one embodiment, client machines 102A-102N include a media player 104 that is configured to play digital media items. Media player 104 may be a video player and/or an audio player. Media player 104 may be a standalone application, may be a plugin to another application (e.g., to a web browser), or may be executable code such as JavaScript that is executed by, for example, a web browser. In one embodiment, media player 104 is a Flash player or a hypertext markup language 5 (HTML5) player. In another embodiment, the client machines 102A-102N may also upload digital media items to the one or more of the servers 110 for storage.

In one embodiment, the media player 104 may be an embedded media player. An embedded media player may be a media player which is inserted (e.g., embedded) into the HTML code of a web page. The web page includes HTML code which inserts (e.g., embeds) the media player into the web page. The embedded media player may be rendered/displayed when the web browser 103 renders (e.g., displays) the web page to the user. For example, the embedded media player may be inserted into a web page using a variety of HTML tags/elements, including but not limited to an embed tag/element (e.g., <embed>), a video tag/element (e.g., <video>), an object tag/element (e.g., <object>), and/or an inline frame (iframe) tag/element (e.g., <iframe>). The web page in which an embedded media player is inserted/embedded into may be referred to as a watch page.

In one embodiment, the client machine 102A-102N may request a digital media item 105 from the server 110. For example, the client machine 102A-102N may request to play a digital media item 105 (e.g., request to stream a digital movie) stored on the server 110. The client machine 102A-102N may download the digital media item 105 onto a storage location (e.g., a memory, a hard drive, etc.) which is coupled to or part of the computing system 102A-102N. For example, the client machine 102A-102N may download and play (e.g., stream) the digital media item 105 from the server 110 and may store the downloaded portion (e.g., buffered portion) of the digital media item 105 in a memory.

In one embodiment, the digital media item 105 may be divided into multiple frames. For example, the digital media item 105 may be a digital video which is divided into multiple video frames (e.g., 30 frames per second of the digital video). In another example, the digital media item 105 may be a digital audio file which is divided into audio frames (e.g., each audio frame is 128 bytes). In a further example, the digital media item 105 may contain both audio and video frames/data and the audio and video frames/data may be correlated with each other.

In one embodiment, certain frames in a digital media item 105 may be keyframes. A keyframe may be a frame which is used to decode and/or process other frames. For example, in a digital video file, an intra-coded picture/frame (i-frame) may be used to decode and/or process other types of frames such as a predicted picture/frame (p-frame) and/or a bi-predictive picture/frame (b-frame). An i-frame and/or a p-frame may be used to decode and/or process a b-frame. The i-frame and/or the p-frame may be a keyframe. In one embodiment, the keyframes may be evenly distributed in the digital media item 105. For example, every tenth frame in a digital media item 105 may be a keyframe.

A user may seek to different portions of a digital media item 105 (e.g., jump to a different location/part of the digital media item 105, or start playback at a different part/location of the digital media item 105) as the media player 104 plays the digital media item 105. In one embodiment, when the user seeks to a specific portion of the digital media item 105, the media player 104 may obtain the keyframe which is closest to the specific portion of the digital media item 105, and continue playback of the digital media item 105 from the keyframe which is closest to the specific portion of the digital media item 105.

In one embodiment, the client machine 102A-102N uses a manifest file to allow a user to seek to a particular location within the digital media item 105. In one embodiment, a manifest file includes a mapping of keyframes (and their play times) to bit/byte locations in the digital media item 105 (e.g., the third keyframe in a digital media item 105 corresponds to the 11 second mark in the playback of the digital media item 105 and the 11$^{th}$ kilobyte of the digital media item 105). In another embodiment, a manifest file may contain additional information including, but not limited to, a name for a digital media item 105, the duration of the digital media item 105, a type of encoding (e.g., MPEG encoding) for the digital media item 105, parameters for a codec used by the digital media item 105, display parameters for the digital media item 105 (e.g., height, width, etc.), a bit rate of the digital media item 105, a language of the digital media item 105, a minimum buffer size of the digital media item 105, bibliographical data (e.g., author/artist name, studio/publisher information, date of publication/release, etc.) for the digital media item 105, digital rights management (DRM) information for the digital media item 105, etc.

Server 110 includes the digital media item 105 (which may be provided and/or downloaded to the clients 102A-102N) and a corresponding manifest file 115. The digital media item 105 and the server-based manifest file 115 may be stored on the same or different servers 110. The server 110 may also include persistent storage that is capable of storing multiple digital media items and multiple manifest files for the digital media items. For example, a digital media item and the manifest file for the digital media item may be stored on the same server. In another example, a digital media item may be stored on one server, and the manifest file for the digital media item may be stored on another server. The digital media items and the manifest files may also be stored in a network-attached file server or some other type of persistent storage such as an object-oriented database, a relational database, and so forth, which may be coupled to the server 110 via the network 109.

In one embodiment, rather then requesting a manifest file from the servers 110 (e.g., rather than requesting the server-based manifest file 115), the media player 104 may generate the manifest file 106 (e.g., a client-based manifest file) while downloading and/or processing the digital media item 105. For example, as the media player 104 plays (e.g., streams) a digital media item 105 from the server 110, the media player 104 will download and process the frames for the digital media item 105. The media player 104 may create the manifest file 106 when it first starts to download the digital media item 105. As the media player 104 downloads and/or processes each frame in the digital media item 105, the media player 104 may analyze the frame to determine whether the frame is a keyframe. If the downloaded/processed frame is a keyframe, the media player 104 may update the mapping of keyframes/play times to bit/byte locations in the manifest file, to include the bit/byte location and play time of the downloaded/processed keyframe.

In one embodiment, when a user requests to seek to a portion of the digital media item 105 which has already been downloaded and/or processed (e.g., a buffered portion of the digital media item 105), the media player 104 may use the manifest file 106 to seek to the request portion of the digital media item 105. After the digital media item 105 is completely downloaded and/or processed, the manifest file 106 may be identical or similar to the server-based manifest file 115 on the server 110. That is, both the manifest file 106 and the server-based manifest file 115 may include identical or similar information (e.g., keyframe to bit/byte mappings) for the digital media item 105. However, the manifest file 106 is generated as the digital media item 105 is being downloaded/processed while the server-based manifest file 115 is downloaded from the server 110, rather than generated by the media player 104.

In one embodiment, when a user requests to seek to an unbuffered portion of the digital media item 105 (e.g., a portion of the digital media item 105 which has not yet been downloaded and/or processed by the media player 104), the media player 104 may download a server-based manifest file 115 from the server 110 and use the server-based manifest file 115 to seek to the unbuffered portion of the digital media item. After the server-based manifest file 115 is downloaded, the media player 104 may use the server-based manifest file 115 for future seek requests for the digital media item 105 and may discard the client-based manifest file 106.

In one embodiment, if the user does not request any seeks to unbuffered portions of the digital media item 105, the digital media item 105 is completely downloaded and/processed by the client 102A-102N, and the client-based manifest file 106 contains the complete mapping of key frames/play times to bit/byte locations in the digital media item 105) and may be identical or similar to the server-based manifest file 115. The media player 104 may then use the client-based manifest file 105 for all seek requests for the digital media item 105, without requesting the server-based manifest file 115 from the server 110.

As discussed above, manifest files were previously provided with digital media items when the digital media items were requested from a server. Previously the manifest files were either provided as separate files (which were received at about the same time the digital media items were received) or as part of the digital media items. By generating the client-based manifest file 106 as the digital media item is being downloaded and/or processed, the media player 104 is able to seek to different buffered portions of the digital media item 105 without downloading a manifest file from the server 110. This allows the client machine 102A-102N to reduce overhead (e.g., reduce the amount of data requested from the server 110 and/or reduce the number of requests for data from the server 110).

FIG. 2 is a block diagram illustrating an exemplary digital media item 200, according to one embodiment. The digital media item 200 may be stored on a server and may be provided/downloaded to a computing system in response to a user request received by a media player. As discussed above, digital media items may be divided into multiple frames. Some of the frames may be keyframes. A keyframe may be a frame which is used to decode and/or process other frames (e.g., i-frames and p-frames). In one embodiment, keyframes are evenly distributed throughout the digital media item.

As shown in FIG. 2, the digital media item 200 is divided into X number of frames. Frames 1, 6, 12, 15, 21, and 27 are keyframes (e.g., frames which may be used to decode and/or process other frames). The digital media item 200 may also include other keyframes which are not shown in the figure. When a user requests the digital media item 200 (via the media player), the computing system may request and download the digital media item 200 from one of the servers 110. As each frame of the digital media item is downloaded, the media player may process each frame (e.g., store each frame in memory and decode/process each frame).

As discussed above, the media player may generate a manifest file when the digital media item is downloaded and/or processed by the media player. Also as discussed above, the manifest file may include a mapping of keyframes/playtimes to bit/byte locations in the digital media item. As each frame of the X frames in the digital media item 200 are downloaded, the media player may store (e.g., buffer) the frame and decode/process the frame. If the media player determines that the frame is a keyframe, the media player may update the manifest file with the play time of the frame and the bit/byte location of the frame in the digital media item 200.

For example, each frame in the digital media item may be 10 kilobytes (kB) in size and each frame may represent 0.1 seconds of play time (e.g., each frame is played/displayed for 0.1 seconds). Frame 1 starts at the $0^{th}$ kB and ends at the $10^{th}$ kB, frame 2 starts at the $10^{th}$ kB and ends at the $20^{th}$ kB, frame 3 starts at the $20^{th}$ kB and ends at the $30^{th}$ kB, and so on and so forth. Frame 1 would play from 0 seconds to 0.1 seconds, frame 2 would play from 0.1 seconds to 0.2 second, frame 3 would play from 0.2 second to 0.3 seconds, and so on and so forth. When frame 1 is processed, the media player may determine that frame 1 is a keyframe and may update the manifest file to include an entry for frame 1. The media player may update the manifest file to include the frame number of the keyframe (e.g., frame #1), the play time at which the keyframe starts (e.g., 0 seconds), and the bit/byte location at which the keyframe starts (e.g., 0 kB). When frames 2, 3, 4, and 5 are downloaded and/or processed, the manifest file is not updated because frames 2, 3, 4, and 5 are not keyframes. When frame 6 is downloaded and/or processed, the media player may determine that frame 6 is a key frame and may update the manifest to include the frame number (e.g., frame #6), the starting play time (e.g., 0.5 seconds) and the byte location (e.g., 50 kB) of frame 6. The media player may update the manifest file for each keyframe (e.g., frames 1, 6, 12, 15, 21, 27, etc.) that is downloaded and processed by the media player. It should be noted that although the frames shown in FIG. 2 are of equal size (e.g., each frame is 10 kB), in other embodiments, the frames in a digital media item may be different sizes. For example, a first frame may be 11 kB, a second frame may be 5 kB, a third frame may be 23 kB, etc.

FIG. 3 is a block diagram illustrating an exemplary digital media item 300, according to one embodiment. The digital media item 300 may be another representation of the digital media item 200. In particular, the digital media item 200 is illustrated as having frames (e.g., frames 1 through X), and the digital media item 300 is illustrated as having a buffered portion 310 and an unbuffered portion 310.

The buffered portion 310 may include the portion (e.g., the frames) of the digital media item 300 which has been downloaded from the server and/or processed by the media player. The unbuffered portion may include the portion (e.g., the frames) of the digital media item 300 which have not been downloaded from the server and have not been processed by the media player.

In one embodiment, the digital media item 300 may be streamed to a media player/computing system (e.g., the media player may playback the downloaded or buffered portions of the digital media item, before the digital media item is completely downloaded from the server). The media player may be able to play/display the buffered portion 310 because the buffered portion 310 has been downloaded, processed, and/or stored (e.g., buffered) on the computing system. Referring back to FIG. 2, the buffered portion 310 may include the first 19 frames of the digital media item 300. In one embodiment, the media player may update the manifest file to include the keyframe/play time to bit/byte location mapping of all the keyframes which the buffered portion 310.

A user may seek to a location within the buffered portion 310 of the digital media item 300. For example, if the first 30 seconds of a digital video have been downloaded and/or processed (e.g., buffered), the user may seek to (e.g., initiate playback at) a play time or location within the first 30 seconds of the digital video (e.g., seek to a buffered portion of the digital video, such as the 15 second mark). When the user requests a seek to a particular location or play time within the buffered portion 310, the media player may use a manifest file, which the media player generates and updates, to seek to the particular location. For example, if the first 60 seconds of a digital video is buffered, the media player will have created and updated the manifest file to include the keyframe/play time to bit/byte location mapping of all keyframes within the first 60 seconds of the digital video. If the user requests to seek to the 35 second mark in the digital video, the media player may use the manifest file to obtained the byte location of the keyframe closest to the 35 second mark, and begin playback of the digital video at the closest keyframe to the 35 second mark.

Alternatively or in addition, the user may seek to a location within the unbuffered portion 320. In response, the media player may request a server-based manifest file from the server. The server-based manifest file may include the mapping of keyframes/play times to byte locations for all of the keyframes in the digital media item 300. The media player may use the server-based manifest file (which includes the mapping information for all the keyframes, not just the downloaded/processed keyframes) to seek to the location within the unbuffered portion 320. For example, if the first 30 seconds of a digital video have been buffered (e.g., downloaded/processed) and a user request to seek to the 45 second mark of the digital video is received, the media player may request and/or download the server-based manifest file from the server. The media player may use the server-based manifest file to determine which keyframe is closest to the 45 second mark of the digital video. The media player may then start downloading and/or processing the digital video start form the keyframe which is closest to the 45 second mark of the digital video so that playback of the digital video may begin at the seek location requested by the user.

In one embodiment, the media player may store previously buffered portions of the digital media item 300, so that the previously buffered portions may be used for subsequent seek requests. For example, the media player may store the buffered portion 310 of a digital media item when the media play receives the request to seek to the unbuffered portion 320 of the digital media item. The media player may buffer the unbuffered portion 320 (e.g., may download the unbuffered portion 320 and store the downloaded unbuffered portion 320) of the digital media item 300. Thus, the unbuffered portion 320 is now a previously buffered portion after the media player downloads and/or stores the unbuffered portion 320. When a subsequent user request to seek to another portion of the digital media item 300 is received, the media player may use the previously buffered portions (e.g., the buffered portion 310 and the downloaded unbuffered portion 320) to seek to the specified portion of the digital media item 300. In one embodiment, the digital media item 300 may have "holes" due to the user seek requests. For example, the media player may buffer the frames 1 (e.g., 0 kB) through 100 (1000 kB) of a digital media item. A user request to seek to frame 150 (e.g., 1500 kb) is received, and the media player may start downloading the digital media item starting at frame 150. The media player may buffer frames 150 to frames 175 (1750 kb) when a user request to seek to frame 200 is received. The media player may start downloading the digital media item starting at frame 200 (2000 kB). The previously downloaded portions of the digital media item (E.g., frames 1 through 100, and frames 150 through 175) are stored by the media player. However, there may be a gap (e.g., a hole) in the digital media item (e.g., frames 101-149), which the media player may download later (e.g., when the user requests a seek to a position within frames 101-149). If a subsequent user request to seek to frame 165 is received, the media player may used the previously buffered portion (e.g., previously buffered frames 150 through 175) to service the seek request.

FIG. 4 is a table 400 illustrating the contents of a manifest file, according to one embodiment. The table 400 may illustrate the contents of the manifest file. The manifest file may be generated by the media player when the media player begins to download a digital media item from the server. The media player may update the manifest file as the media player downloads and/or processes the frames/keyframes of the digital media item.

The table 400 includes three columns, a "Frame #" column, a "Play Time" column, and a "Byte Location" column. The "Frame #" column shows the frame number for each keyframe downloaded and processed by the media player. Referring back to FIGS. 2 and 3, the table 400 shows the frame number for all of the keyframes which have been downloaded for the digital media item 200/300. As shown in FIGS. 2 and 3, the first 19 frames of the digital media item 200/300 have been downloaded. Out of the first 19 frames, frames 1, 6, 12, and 15 are keyframes and those frame numbers (e.g., frames 1, 6, 12, and 15) are listed in the table 400. The "Play Time" column shows the play time at which each keyframe starts. For example, referring back to FIG. 2, because each frame has a play time of 0.1 seconds, the starting play time for frame 1 (e.g., the first keyframe) is 0 seconds, the starting play time for frame 6 (e.g., the second keyframe) is 0.5 seconds, etc. The "Byte Location" column shows the byte location for the beginning of each keyframe. For example, referring back to FIG. 2, because each frame has size of 10 kB, the byte location for frame 1 (e.g., the first keyframe) is 0 kB, the byte location for frame 6 (e.g., the second keyframe) is 50 kB, etc.

FIG. 5 is a table 500 illustrating the contents of a manifest file, according to another embodiment. The table 500 may illustrate the contents of a server-based manifest file (e.g., server-based manifest file 115). The server-based manifest file is stored on the server and may be provided to the media player when the user requests to seek to a location in an unbuffered portion of a digital media item. The server-based manifest file may include the mapping of keyframes/play times to byte locations, for all of the keyframes in the digital media item. In one embodiment, the media player may use the server-based manifest file to seek to an unbuffered location because the media player has not downloaded and processed keyframes for the unbuffered location and the keyframe information for the unbuffered portion is not in the manifest file generated by the media player.

Similar to table 400, the table 500 includes three columns, a "Frame #" column, a "Play Time" column, and a "Byte Location" column. The "Frame #" column shows the frame number for each keyframe downloaded and processed by the media player. The "Play Time" column shows the starting play time at which each keyframe starts. The "Byte Location" column shows the byte location for the beginning of each keyframe. As discussed above, the server-based manifest file includes the keyframe/play time to byte location mapping, for each keyframe in the digital media item.

Figure 6:
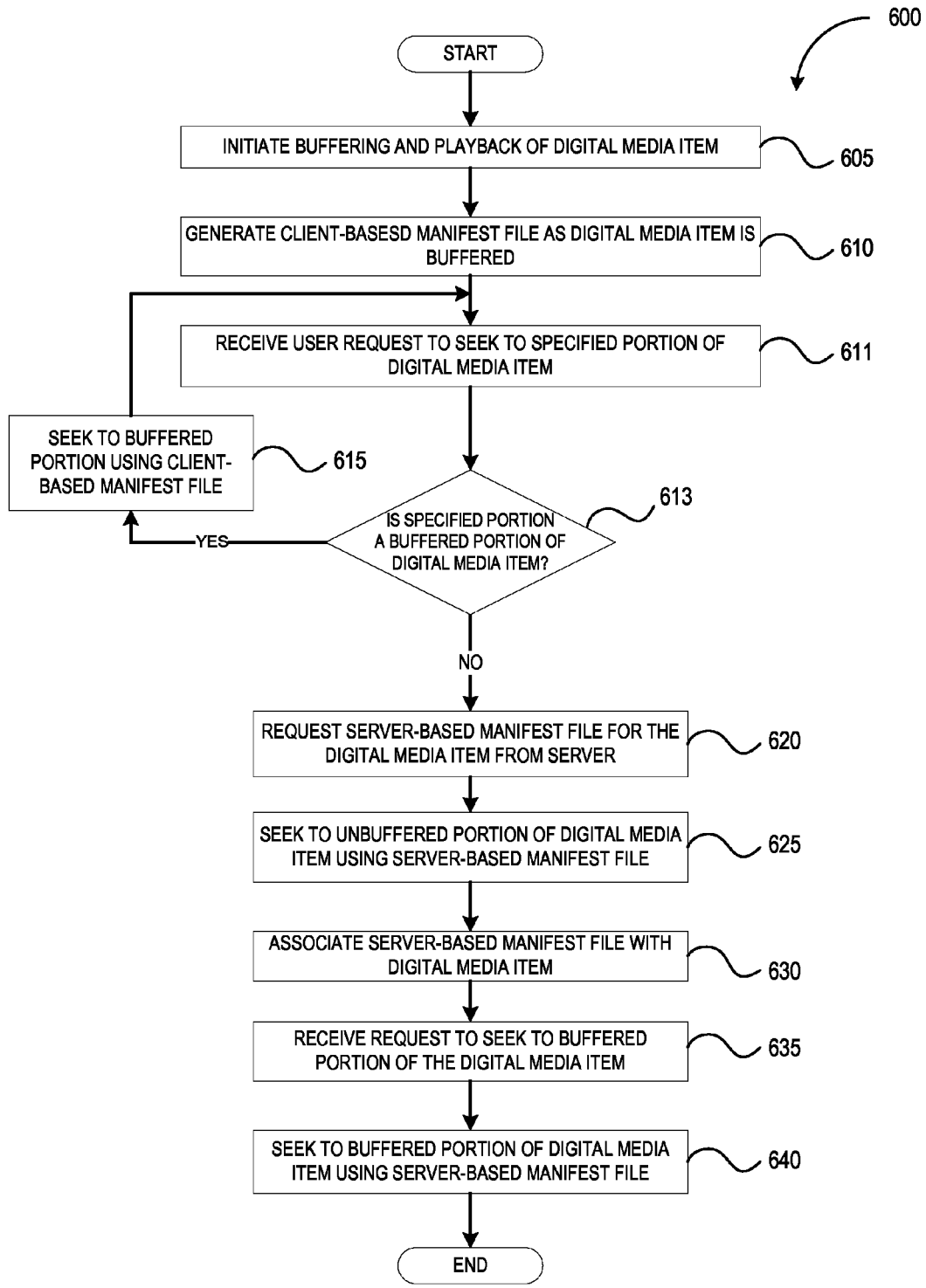
FIG. 6 is a flow diagram illustrating a method for obtaining a manifest file for a digital media item, according to one embodiment.

FIG. 6 is a flow diagram illustrating a method 600 for sharing a digital media item. The method 600 may be performed by processing logic that may comprise hardware (circuitry, dedicated logic, etc.), software (such as is run on a general purpose computer system or a dedicated machine), or a combination of both. For simplicity of explanation, the method 600 is depicted and described as a series of acts. However, acts in accordance with this disclosure can occur in various orders and/or concurrently, and with other acts not presented and described herein. Furthermore, not all illustrated acts may be required to implement the method 600 in accordance with the disclosed subject matter. In addition, those skilled in the art will understand and appreciate that the method 600 could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one embodiment, the method 600 is performed by a client machine (e.g., a media player of a client machine). Alternatively, the methods may be performed by a combination of a server and a client machine. For example, the operations of the methods may be divided between a client and server.

Referring to FIG. 6, the method 600 starts at block 605, wherein the client machine initiates buffering (e.g., downloaded and/or processing) and playback of a digital media item. The buffering and playback of the digital media item may be initiated in response to a user request to play the digital media item (e.g., in response to user input received via a media player executing on a client machine, such as the user selection of a digital media item). At block 610, the client machine generates the manifest file as the digital media item is being buffered. As discussed above, in one embodiment, the client machine may generate the manifest file and may update the manifest file as each key frame in the digital media item is downloaded and/or processed.

The client machine receives a user request (e.g., via a graphical user interface (GUI) and/or the media player) to seek to (e.g., to initiate playback or skip to) a specified portion of the digital media item (e.g., to a location in a portion of the digital media item which has not been downloaded and/or processed), at block 611. At block 613, the client machine determines whether the specified portion is a buffered portion of the digital media item. If so, the client machine seeks to the buffered portion of the digital media item using the client-based manifest file (block 615).

If the specified portion is an unbuffered portion of the digital media item (e.g., a portion of the digital media item which has not been downloaded and/or processed), the client machine requests the server-based manifest file for the digital media item from the server (block 620). At block 625, the client machine may seek to the unbuffered portion of the digital media item using the server-based manifest file.

The client machine also associates the server-based manifest file with the digital media item at block 630. For example, the client machine may map the server-based manifest file to the digital media item, so that the media player can look up and use the server-based manifest file for subsequent seek requests in the digital media item. Associating the server-based manifest file with the digital media item allows the client machine to use the server-based manifest file when subsequent seek requests are received from the user. In one embodiment, the manifest file generated at block 610 is not used for subsequent requests because the manifest file may not have a complete mapping of keyframes to byte locations, while the server-based manifest file may have a complete mapping of keyframes to bye locations. At block 635, the client machine receives a request to seek to a buffered portion of the digital media item (a location within the buffered portion of the digital media item). The client machine seeks to (e.g., initiates playback or skips to) the buffered portion using the server-based manifest file at block 640.

In one embodiment, the client machine may use the server-based manifest file for all subsequent seek requests after the server-based manifest file is requested at block 620. For example, the client machine may use the server-based manifest file for seeks to both buffered and unbuffered portions of a digital media item after the client machine receives the server-based manifest file.

As discussed above, in one embodiment, the user may not request any seeks to unbuffered portions of the digital media item. Because the digital media item 105 was completely downloaded without any unbuffered seeks, the manifest file 106 may be completely generated (e.g., the manifest file contains the complete mapping of key frames/play times to bit/byte locations in the digital media item 105). If the manifest file 106 is completely generated then the client machine may associate the generated manifest file with the digital media item. The manifest file is then used for all subsequent seek requests for the digital media item, rather than requesting the server-based manifest file from the server.

Figure 7:
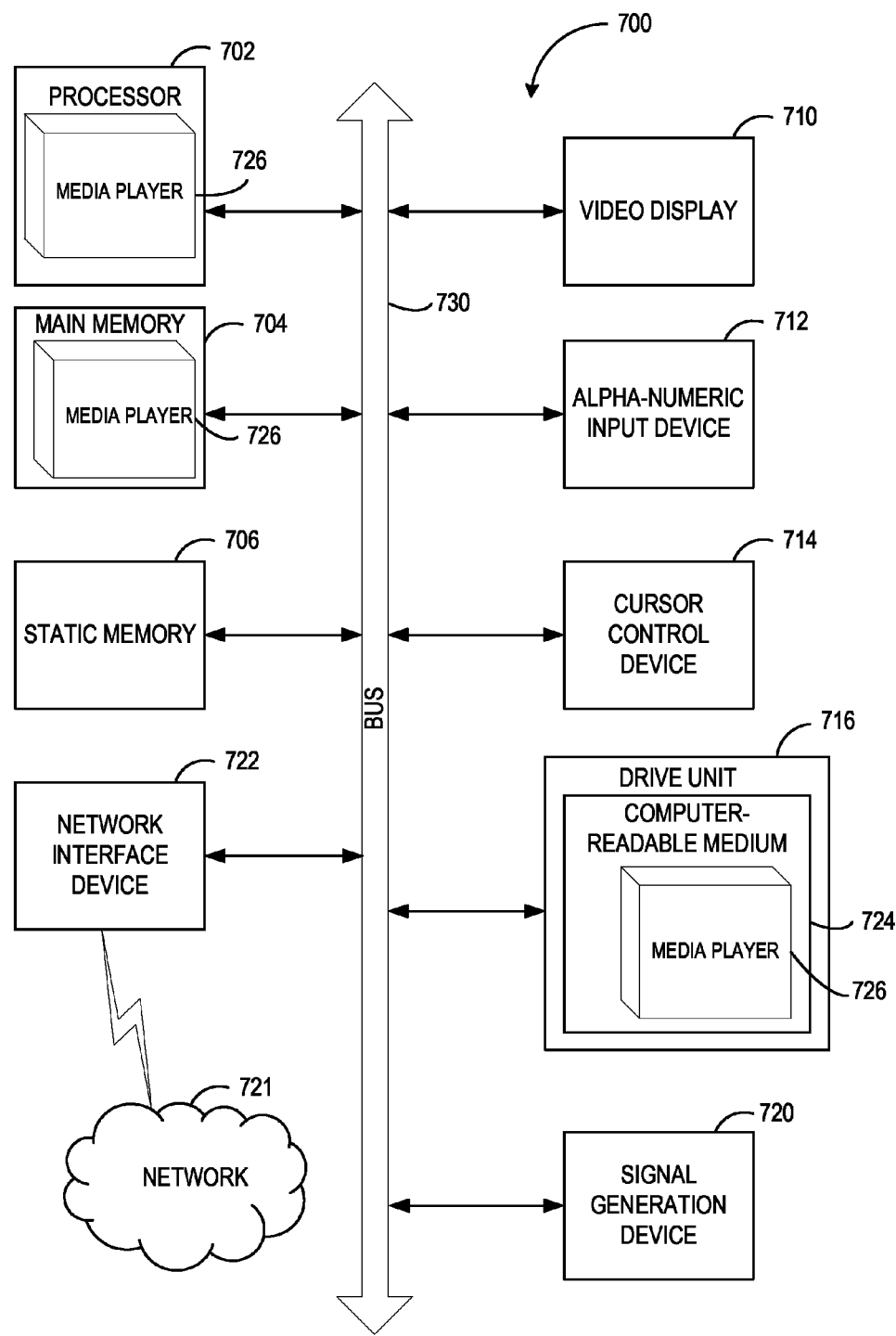
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a smart phone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one embodiment, the video display 710, the alpha-numeric devices 712 and the cursor control device 714 may be combined into a single device, such as a touchscreen.

The data storage device 716 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 721 via the network interface device 722.

In one embodiment, the instructions 726 include instructions for a media player such as media player 104 of FIG. 1. While the computer-readable storage medium 724 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating", "generating", "receiving", "requesting", "seeking," "associating", "buffering", "mapping", "downloading", "playing", "processing", "decoding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

We claim:

1. A method comprising:

in response to a user request to play a digital media item, initiating, by a client device, buffering and playback of the digital media item hosted by a server device;

generating, by the client device, a first manifest file while the digital media item is being buffered and played by the client device, without requesting a second manifest file for the digital media item from the server device;

receiving, during the playback of the digital media item, a user request to seek to a specified portion of the digital media item; and responsive to the user request, determining whether to use the first manifest file for the user request, wherein determining whether to use the first manifest file for the user request comprises:

determining whether the specified portion is a buffered portion of the digital media item, which has been already covered in the first manifest file;

upon determining, during the playback of the digital media item, that the specified portion in the user request is the buffered portion of the digital media item, which has been already covered in the first manifest file, seeking, by the client device, to the buffered portion of the digital media item using the first manifest file; and upon determining, during the playback of the digital media item, that the specified portion in the user request is an unbuffered portion of the digital media item, which has not yet been covered in the first manifest file, requesting, by the client device, the second manifest file for the digital media item from the server device, and seeking, by the client device, to the unbuffered portion of the digital media item using the second manifest file.

2. The method of claim 1, further comprising:

associating the second manifest file with the digital media item;

receiving a second request to seek to a buffered portion of the digital media item; and seeking to the buffered portion of the digital media item using the second manifest file.

3. The method of claim 1, wherein the first manifest file and the second manifest file comprise a mapping of keyframes in the digital media item to byte locations in the digital media item.

4. The method of claim 3, wherein the client device lacks the mapping of keyframes in the digital media item to byte locations in the digital media item, prior to initiating playback and buffering of the digital media item.

5. The method of claim 3, wherein the keyframes comprise i-frames.

6. The method of claim 1, further comprising:
storing the buffered portion of the digital media item; and
downloading and storing at least a portion of the unbuffered portion of the digital media item.

7. The method of claim 6, further comprising:
upon receiving, during the playback of the digital media item, a user request to seek to a third portion of the digital media item, using the buffered portion or the stored portion of the unbuffered portion to seek to the third portion.

8. A system comprising:
a client device having a processing device configured to:
in response to a user request to play a digital media item, initiate buffering and playback of the digital media item hosted by a server device;
generate a first manifest file while the digital media item is being buffered and played by the client device, without requesting a second manifest file for the digital media item from the server device;
receive, during the playback of the digital media item, a user request to seek to a specified portion of the digital media item; and
responsive to the user request, determine whether to use the first manifest file for the user request, wherein to determine whether to use the first manifest file for the user request, the processing device is configured to:
determine whether the specified portion is a buffered portion of the digital media item, which has been already covered in the first manifest file;
upon determining, during the playback of the digital media item, that the specified portion in the user request is the buffered portion of the digital media item, which has been already covered in the first manifest file, seek to the buffered portion of the digital media item using the first manifest file; and
upon determining, during the playback of the digital media item, that the specified portion in the user request is an unbuffered portion of the digital media item, which has not yet been covered in the first manifest file, request the second manifest file for the digital media item from the server device, and seek to the unbuffered portion of the digital media item using the second manifest file.

9. The system of claim 8, wherein the processing device is further configured to:
associate the second manifest file with the digital media item;
receive a second request to seek to a buffered portion of the digital media item; and
seek to the buffered portion of the digital media item using the second manifest file.

10. The system of claim 8, wherein the first manifest file and the second manifest file comprise a mapping of keyframes in the digital media item to byte locations in the digital media item.

11. The system of claim 10, wherein the system lacks the mapping of keyframes in the digital media item to byte locations in the digital media item, prior to initiating playback and buffering of the digital media item.

12. The system of claim 10, wherein the keyframes comprise i-frames.

13. The system of claim 8, wherein the processing device is further configured to:
store the buffered portion of the digital media item; and
download and store at least a portion of the unbuffered portion of the digital media item.

14. The system of claim 13, wherein the processing device is further configured to:
upon receiving, during the playback of the digital media item, a user request to seek to a third portion of the digital media item, use the buffered portion or the stored portion of the unbuffered portion to seek to the third portion.

15. A non-transitory computer readable storage medium encoding instructions thereon that, in response to execution by a processing device of a client device, cause the processing device to perform operations comprising:
in response to a user request to play a digital media item, initiating, by the processing device, buffering and playback of the digital media item hosted by a server device;
generating, by the processing device, a first manifest file while the digital media item is being buffered and played by the client device, without requesting a second manifest file for the digital media item from the server device;
receiving, during the playback of the digital media item, a user request to seek to a specified portion of the digital media item; and
responsive to the user request, determining whether to use the first manifest file for the user request, wherein determining whether to use the first manifest file for the user request comprises:
determining whether the specified portion is a buffered portion of the digital media item, which has been already covered in the first manifest file;
upon determining, during the playback of the digital media item, that the specified portion in the user request is the buffered portion of the digital media item, which has been already covered in the first manifest file, seeking, by the processing device, to the buffered portion of the digital media item using the first manifest file; and
upon determining, during the playback of the digital media item, that the specified portion in the user request is an unbuffered portion of the digital media item, which has not yet been covered in the manifest file, requesting, by the processing device, a second manifest file for the digital media item from the server device, and seeking, by the processing device, to the unbuffered portion of the digital media item using the second manifest file.

16. The non-transitory computer readable storage medium of claim 15, wherein the operations further comprise:
associating the second manifest file with the digital media item;
receiving a second request to seek to a buffered portion of the digital media item; and
seeking to the buffered portion of the digital media item using the second manifest file.

17. The non-transitory computer readable storage medium of claim 15, wherein the first manifest file and the second manifest file comprise a mapping of keyframes in the digital media item to byte locations in the digital media item.

18. The non-transitory computer readable storage medium of claim 17, wherein the processing device lacks the mapping of keyframes in the digital media item to byte locations in the digital media item, prior to initiating playback and buffering of the digital media item.

19. The non-transitory computer readable storage medium of claim 17, wherein the keyframes comprise i-frames.

20. The non-transitory computer readable storage medium of claim 15, wherein the operations further comprise:
   storing the buffered portion of the digital media item; and
   downloading and storing at least a portion of the unbuffered portion of the digital media item.

21. The non-transitory computer readable storage medium of claim 20, wherein the operations further comprise:
   upon receiving, during the playback of the digital media item, a user request to seek to a third portion of the digital media item, using the buffered portion or the stored portion of the unbuffered portion to seek to the third portion.

* * * * *